July 15, 1958  J. DOLZA ET AL  2,843,096
FUEL DISTRIBUTION MEANS
Filed June 29, 1956  5 Sheets-Sheet 1

Fig. 1

INVENTORS
John Dolza
Raymond J. Haefner &
BY George P. Ransom
L. D. Burch
ATTORNEY July 15, 1958  J. DOLZA ET AL  2,843,096
FUEL DISTRIBUTION MEANS
Filed June 29, 1956  5 Sheets-Sheet 2

Fig. 2

INVENTORS
John Dolza,
Raymond J. Haefner &
BY George P. Ransom
L. D. Burch
ATTORNEY July 15, 1958  J. DOLZA ET AL  2,843,096
FUEL DISTRIBUTION MEANS
Filed June 29, 1956  5 Sheets-Sheet 3

INVENTORS
John Dolza,
Raymond J. Hefner &
BY George P. Ransom
L. D. Burch
ATTORNEY July 15, 1958  J. DOLZA ET AL  2,843,096
FUEL DISTRIBUTION MEANS
Filed June 29, 1956  5 Sheets-Sheet 4

INVENTORS
John Dolza
Raymond J. Haefner &
BY George P. Ransom
L. D. Burch
ATTORNEY United States Patent Office 2,843,096
Patented July 15, 1958

2,843,096

FUEL DISTRIBUTION MEANS

John Dolza, Fenton, Raymond J. Haefner, Utica, and George P. Ransom, Berkley, Mich., assignors to General Motors Corporation, Detroit, Mich., a corporation of Delaware Application June 29, 1956, Serial No. 594,796

15 Claims. (Cl. 123—119)

The present invention relates to fuel injection systems for internal combustion engines and more particularly to means for metering the fuel flow and to the distribution system for dividing the metered fuel into equal increments and distributing these increments to the charges for the various cylinders of the engine.

In the operation of engines of the so-called spark ignited type, a combustible charge is formed by mixing atomized fuel with the air and igniting the air in a cylinder by means such as an electrical discharge. In the past in automotive and similar engines, this has normally been accomplished by forming the combustible charge in a carburetor having one or more fuel jets therein and then distributing the charge to the various cylinders by means of a plurality of induction passages. In order to obtain the optimum performance from an engine, it is essential that each of the cylinders receive charges of identical volumes and proportions. However, a carburetor and intake manifold will fail to accomplish this objective and, accordingly, numerous attempts have been made to devise a commercially practical means for injecting atomized fuel directly into the induction air immediately adjacent the intake valves or into the cylinders.

Heretofore, in such systems in order to obtain an accurate division of the fuel flow to the cylinders, it has been necessary to resort to complicated flow dividers, rotary distributors, etc. In addition, due to the action of the various injection pumps, the heat of the engine, etc., there is a tendency for the fuel to vaporize in the injection system. The resultant vapors will form vapor locks in the system which will cause inaccurate metering and/or complete failure of the injection system and the engine. As a result in order to accurately meter and distribute the fuel, previous injection systems have been complicated and expensive due to excessive amounts of precision machined parts, etc. This, in turn, has made sych systems impractical for use on mass produced automotive engines from a commercial standpoint.

It is now proposed to provide a simple and economical fuel injection system which is capable of precisely metering the desired amount of fuel during all engine operating conditions and to also insure an accurately uniform distribution of identical quantities of fuel to all of the engine cylinders. The proposed system employs a suitable pump for delivering fuel under pressure to a distributor adapted to simultaneously meter the fuel and distribute equal increments thereof to each of the various engine cylinders. The distributor includes a distributing chamber having one end thereof connected to the outlet of a fuel pump. The other end of the chamber includes a by-pass valve that is actuated by means responsive to the volume of fuel required by the engine so that the surplus fuel will be by-passed for return to the fuel source. In addition, a plurality of substantially identical injector lines may radiate from the chamber to terminate at a plurality of injector nozzles disposed in the induction passages. The injector lines intersect the distributing chamber at substantially equally spaced points and at substantially identical angles. The fuel will thus enter the chamber and flow axially therethrough in an orderly manner with the metered fuel discharged through the injector lines and the surplus fuel by-passed through the valve for return to the supply tank. It will be seen that the unidirectional longitudinal flow through the distributing chamber will allow the fuel to enter the injector lines from the chamber free from any directional effects. Thus by symmetry of all of the elements equal quantities of fuel flow outwardly through all of the tubes and injector lines and into the charges for the cylinders.

It has also been found desirable to provide a pressure check valve in the inlet to the distributing chamber. This valve is a one-way valve for allowing the fuel to flow into the chamber but not out of it. At the same time this valve will maintain an appreciable pressure in the fuel in the system upstream of the check valve. This pressure is adequate to substantially eliminate any vaporization of the fuel in that portion of the system. If any fuel vapors form in the low pressure fuel present in the distributing chamber and injector lines, the check valve will prevent them from backing up into the remainder of the injection system. It will thus be apparent that the fuel pump will always be full of vaporless fuel and fully primed. By maintaining the volume of the fuel in the distributing chamber and the injector lines very small, in the event there is any vaporization of the fuel in the portion of the system downstream of the check valve, it will be of very small volume and since the pump, etc. will be maintained primed with unvaporized fuel, any vapors existing downstream of the valve will be very rapidly swept therefrom.

Figure 1:
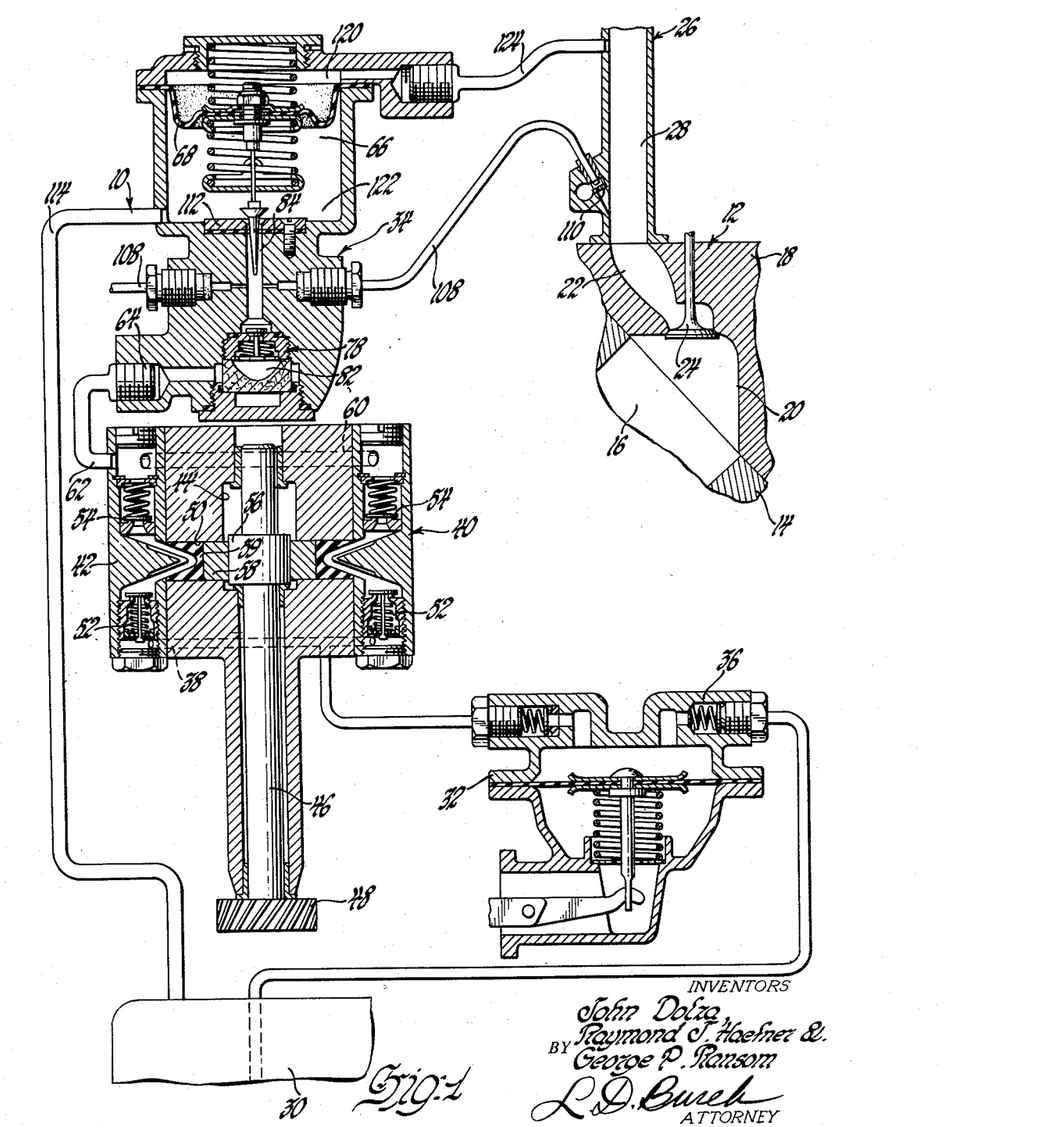
Figure 1 is a diagrammatic view of a fuel injection system embodying the present invention.

Referring to the drawings in more detail the present invention may be adapted for use in a fuel injection system 10 for use on an internal combustion engine 12. The engine 12 may be of any suitable design; for example, so-called V-type engine having a pair of angularly disposed banks 14 of cylinders 16 with a cylinder head 18 secured to each bank 14. These heads 18 include cavities 20 that cooperate with the open ends of the cylinders 16 to form combustion chambers. The heads 18 may also include intake passages 22 that communicate with the combustion chambers for charging the cylinders 16. Intake valves 24 are provided in the intake passages 22 that regulate the flow of the charge into the cylinders 16. An induction system 26 may be provided that includes a plurality of induction passages 28 that are interconnected with the intake passages 22 for supplying a charge to the cylinders 16. If desired, these passages 22 and 28 may be tuned to resonate during one or more engine operating conditions so that the surges of air therein will dynamically supercharge the cylinders 16.

The present fuel injection system 10 includes any suitable source of fuel such as a storage tank 30, pumping means 32 and a combination metering and distributing unit 34.

The present pumping means 32 may include a supply or transfer pump 36 such as a low pressure, high volume diaphragm pump. The inlet of this pump 36 is connected to the storage tank 30, while the outlet is connected to the inlet manifold 38 in a booster or injector pump 40. This will insure a supply of fuel under pressure at all times, thereby reducing the likelihood of vapor lock.

Although the injector pump 40 may be of any desired design, in the present instance it includes a pump housing 42 having an axial passage 44 therethrough. A driveshaft 46 is disposed in this passage 44 and has a gear 48 on the lower end which may be driven from any suitable power source such as the engine camshaft. A pair of diametrically aligned passages 50 may be disposed radially to the passage 44 to form a pair of pumping cells having inlet and outlet valves 52 and 54. A cam 56 may be disposed on said driveshaft 46 in alignment with the axis of said aligned passage 50 so that a pair of metallic plugs 58 disposed in said passages will engage the cam 56 and be reciprocably driven thereby. A pair of resilient plugs 59 may be disposed in the cells so as to be compressed by the plugs 58 and thus draw fuel from the inlet manifold 38 and discharge it through the outlet manifold 60 and into one end of a fuel line 62. The opposite end of this fuel line 62 is, in turn, connected to the inlet 64 in the base of the combination metering and distributing unit 34.

Figure 2:
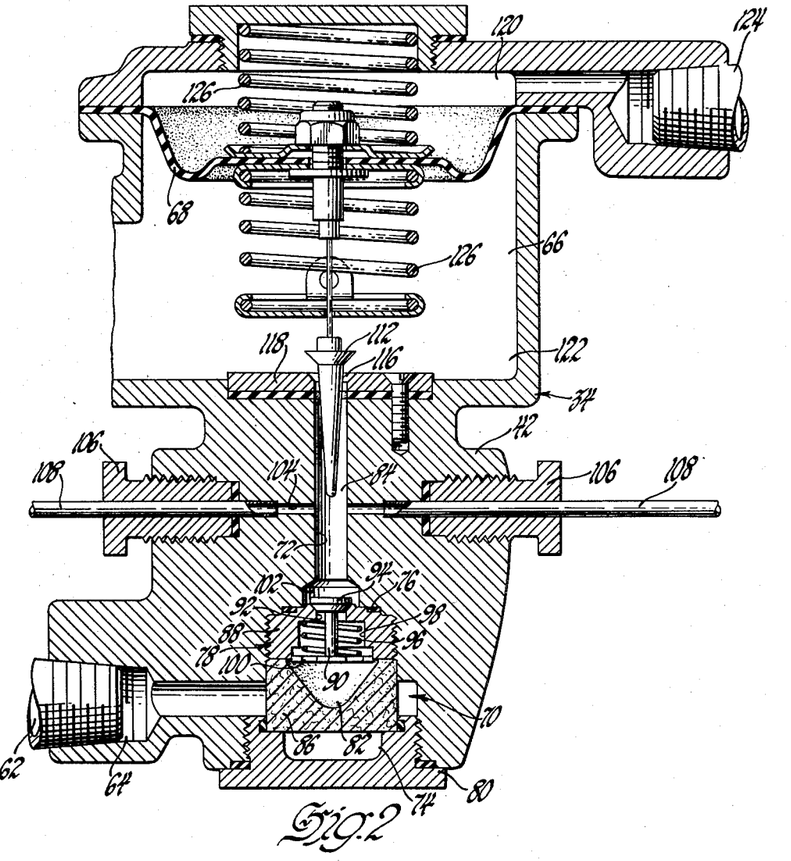
Figure 2 is a cross sectional view on an enlarged scale of the metering and distributing unit employed in the system of Figure 1.

The upper end of this unit 34 includes a chamber 66 having a pressure responsive means such as a diaphragm 68 therein. This diaphragm 68 is exposed to an air pressure signal such as the intake vacuum which is indicative of the fuel demands of the engine 12.

The lower end of the unit 34 includes a distributing portion having a bore 70 that extends axially from the lower end of the housing upwardly into diaphragm chamber 66. The present bore 70 includes an inner portion 72 of reduced diameter and an outer portion 74 of enlarged diameter that are separated from each other by a shoulder 76. A pressure relief or one-way check valve 78 may be threaded into the inner end of the enlarged portion 74 so as to compress a sealing member against the shoulder 76 and a plug 80 may be threaded into the outer end. It will thus be seen that the bore 70 is divided into an inlet chamber 82 and a distributing chamber 84. The inlet passage 64 that receives the end of fuel line 62 may extend inwardly from the side of the housing 42 and into the inlet chamber 82 for delivering the fuel discharged from the injector pump 40 into the inlet chamber 82. It has been found desirable to provide a fine filter member 86 such as a piece of porous powdered metal in the inlet. This member 86 is disposed in the inlet chamber 82 and is clamped between the check valve 78 and the plug 80 so that all of the fuel must flow through the filter.

The present check valve 78 which separates the inlet chamber 82 from the distributing chamber 84 includes a housing 88 threaded into the inner end of the enlarged portion 74 to engage the shoulder 76 and compress a sealing member therebetween. A pintle or poppet type valve member 90 is disposed in a passage 92 through the housing 88 so that an enlarged head 94 will open and close the opening formed in the housing 88 by the passage 92. A spring 96 disposed in a pocket 98 inside of the housing 88 engages the guide 100 and biases the valve 90 closed. However, the fuel in the inlet chamber 82 will act on the underside of the head 94 and tend to force the valve 90 open. It is thus apparent that the fuel pressure in the space between the pump 36 and check valve 78 will be considerably higher than the fuel pressure in the distributing chamber 84. The guide 100 rides on the inside of the pocket 98 to keep the valve 90 in axial alignment. In addition, a recessed and beveled chamber 102 may be formed around the head of the valve 90. This will cause the fuel flowing outwardly around the head 94 to be diverted radially inwardly so as to enter the lower end of the distributing chamber 84 in a substantially axial direction free from any unsymmetrical side effects.

The distributing chamber 84 is preferably a passage of substantially uniform cross section over its entire length which extends from the check valve 78 to the diaphragm chamber 66. A plurality of substantially identical small passages 104 corresponding in number to the number of engine cylinders may be drilled through the sides of the housing 42 to intersect the distributing chamber 84 at substantially equal spaced points and at substantially identical angles. It has been found preferable but not essential for these passages 104 to be disposed in a common plane and radial to the axis of the chamber 84. A plurality of fittings 106 may be threaded into the outer ends of these passages 104 so that injector lines 108 will be retained in alignment with the radial passages 104. The outer ends of these lines 108 are equipped with injector nozzles 110 such as disclosed and claimed in co-pending application Serial No. 512,175, Fuel Injection Nozzle filed May 31, 1955, in the names of Max F. Homfeld and Stephen Kalmar. The injector lines 108 should have a small diameter so that the amount of fuel contained therein will be very small. However, the diameters are preferably large enough so that the resistances thereof are considerably less than the resistances of the nozzles 110. Thus even though there are a few minor irregularities in the sizes of the injector lines 108, if the nozzles 110 are maintained substantially identical the fuel will be divided equally for distribution to the cylinders.

In order to control the volume of the fuel discharged into the charges in the intake passages 22, a by-pass valve 112 may be disposed in the upper end of the distributing chamber 84 to allow the surplus fuel to be by-passed from the distributing chamber 84 into the bottom of the diaphragm chamber 66. This surplus fuel may drain through the spill fuel line 114 for return to the fuel tank 30. The present by-pass valve 112 is of the so-called needle valve type wherein an elongated tapered needle extends into an orifice 116. The orifice 116 is preferably disposed at the top of the distributing chamber 84 above the radial passages 104 so as to reduce any directional flow effects on the volume of fuel flowing into the injector lines. Although the orifice 116 may be formed by the upper end of the chamber 84, it has been found desirable to employ a separate plate 118 having the orifice 116 machined therethrough. The plate 118 is then secured to the housing 42 so as to register with the open end of the distributing chamber 84 and allow the needle valve 112 to project through the orifice 116 and into the chamber 84.

The needle valve 112 is connected to the diaphragm 68 by a rigid wire. As previously stated the chamber 120 above the diaphragm is interconnected with the intake manifold by a control signal line 124 while the lower chamber 122 is vented to the atmosphere. It is thus apparent that when the throttle is closed and the intake vacuum is high, the diaphragm will withdraw the needle 112 from the orifice 116 and allow a maximum amount of fuel to be by-passed from the distributing chamber 84. This, in turn, will reduce the volume of fuel flowing through the injector lines 108 for distribution to the intake passages 22. Conversely, when the throttle valve is open and the manifold vacuum is low, the springs 126 will force the needle 112 into the orifice 116, thereby reducing the volume of by-passed fuel and, consequently, increasing the amount of fuel delivered to the intake passages 22.

It will thus be seen that during operation of the engine 12, the fuel will be drawn from the tank 30 by the transfer pump 36 and forced into the inlet manifold 38 for the injector pump 40. The driveshaft 46 in the injector pump 40 which is driven from the engine camshaft will actuate the pumping cells and force the fuel therein to then be discharged into the inlet chamber 82 and pass through the filter 86. If the fuel pressure is adequate the check valve 78 will open and allow the fuel to flow into the distributing chamber 84. The fuel will then be divided, the metered fuel being distributed in equal increments through the injector lines 108 to the cylinders and the surplus fuel being by-passed through the valve 112 for return to the fuel storage tank 30 by way of the spill fuel line.

The check valve 78 will maintain a positive pressure in the fuel pumps, the fuel line, inlet chamber, etc. sufficient to prevent the formation of any vapors in the fuel. Although the fuel downstream from the check valve 78 will not necessarily be maintained at an elevated pressure, the volume of the distributing chamber and injector lines will be very small and if any vapors do form therein they will be of minor consequence. It may thus be seen that a fuel distribution system has been provided that will permit accuate metering of the fuel and a precise distribution of identical increments of fuel to the cylinders.

Figure 3:
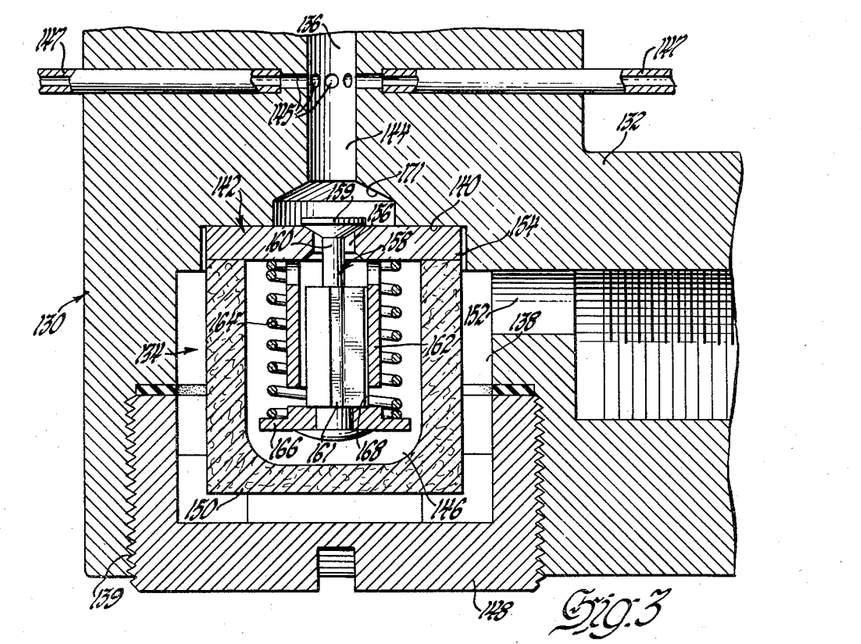
Figure 3 is a fragmentary cross sectional view similar to Figure 2 of a slightly different embodiment of another metering and distributing unit.

Figure 3 discloses another embodiment of a combination distributing and metering unit similar to that disclosed in Figures 1 and 2. This unit 130 includes a housing 132 having a bore 134 extending vertically upwardly therethrough and includes an upper portion 136 of reduced diameter and a lower portion 138 of enlarged diameter. The lower portion 138 forms an opening 139 in the bottom of the housing 132 and is divided from the upper portion by a shoulder 140.

A pressure check valve 142 may seat on the shoulder 140 and thereby separate the two portions 136 and 138 from each other and thus form a distributing chamber 144 and an inlet chamber 146. The distributing chamber 144 is a substantially cylindrical passage so that the fuel will flow axially therethrough. A plurality of radial passages 145 may be drilled through the housing 132 so as to intersect the distributing chamber 144 at approximately equally spaced points and at substantially identical angles. Injector lines 147 are pressed into the outer ends of these passages to distribute the fuel to injector nozzles mounted in the induction passages. A plug 148 threaded into the opening 139 in the bottom of the housing 132 to close the lower end of the inlet chamber 146 and at the same time forces a cup-shaped filter element 150 against the check valve 142 and thus retain the check valve 142 seated on the shoulder 140. An inlet passage 152 may extend through the side of the housing 132 to intersect the inlet chamber 146. This passage 152 may be connected to the outlet of an injector pump for delivering fuel under pressure into the inlet chamber 146.

The check valve 142 is a one-way valve that permits fuel to flow from the inlet chamber 146 to the distributing chamber 144 but at the same time prevents a reverse flow. The valve 142 includes a plate 154 having a small passage 156 extending therethrough between the two chambers 144 and 146. A poppet type valve member 158 is disposed in this passage 156 with the stem 160 projecting through the passage and the enlarged head 159 positioned to open and close the passage 156. The stem 160 includes a barrel 161 having flutes 168 which slides on the inside of a guide member 162 that depends from the lower side of the plate 154. A coil spring 164 encompasses the guide 162 and seats on the plate 154 and a flange 166 on the lower end of the stem 160 and biases the valve 158 towards the closed position. It may be seen that the flutes 168 on the barrel portion 161 slide against the interior of the guide 162 and thereby maintain the valve 158 in axial alignment at all times. Consequently, the space between the head 159 and the passage in the plate 154 will be circumferentially uniform. Thus the fuel flowing through this space will flow equally in all directions, i. e., it will not be diverted unequally toward one side or another as might otherwise occur if the valve 158 were "cocked." After the fuel flows outwardly around the head 159 it will be diverted inwardly by the beveled entrance 171 to the distributing chamber 144. From there the fuel will flow upwardly through the distributing chamber free from any directional effects. Thus it will be seen that this distributing system will insure the fuel being uniformly distributed to all of the cylinders in the engine.

Figure 4:
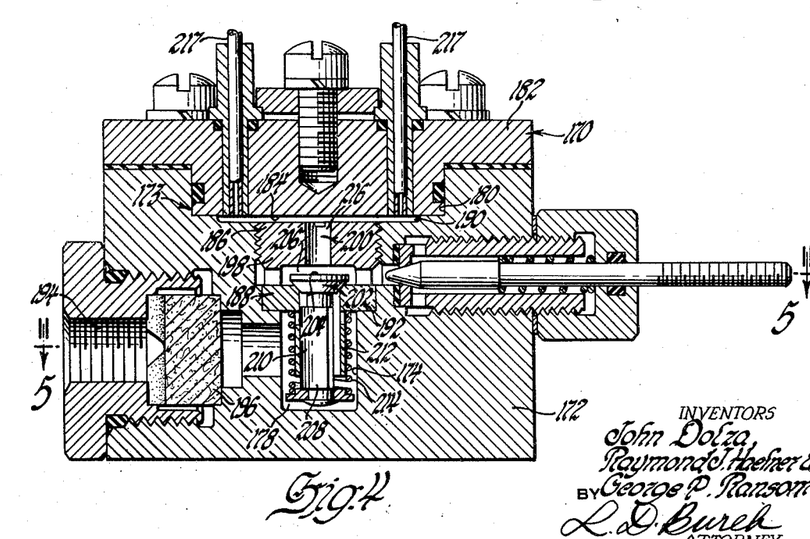
Figure 4 is a cross sectional view of another embodiment of a distributing unit.
Figure 5:
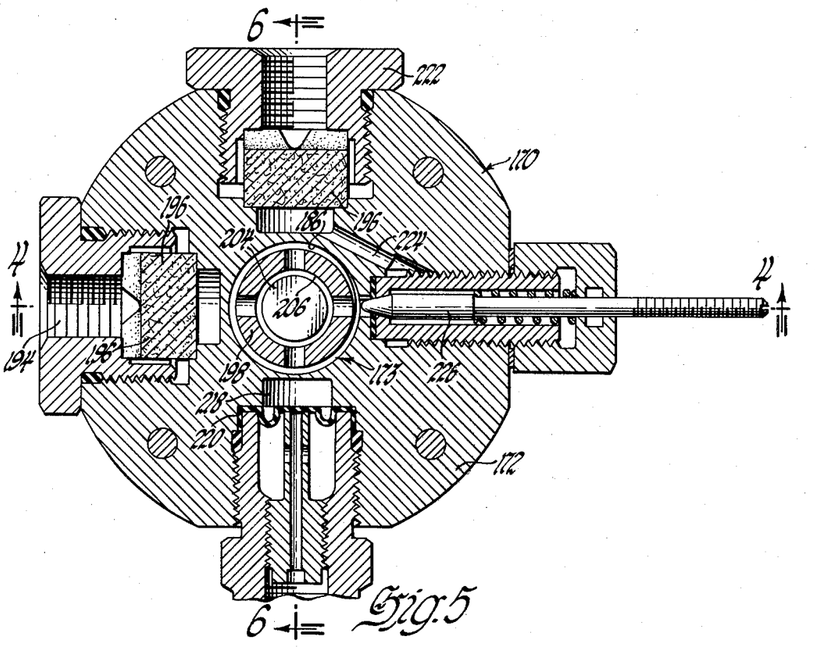
Figure 5 is a cross sectional view taken substantially along the plane of line 5—5 in Figure 4.
Figure 6:
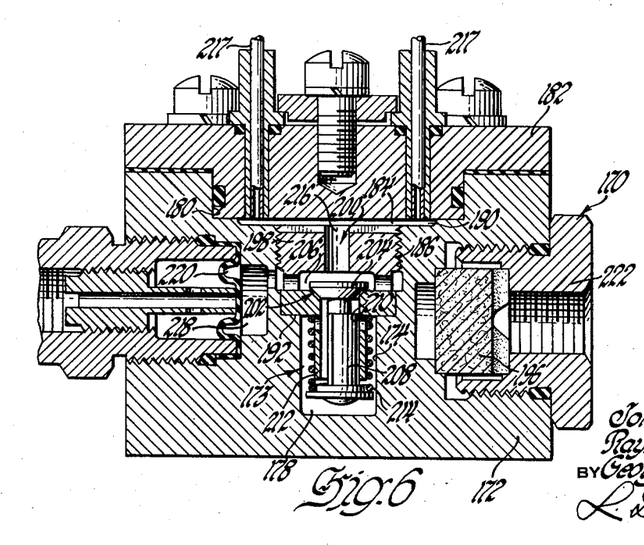
Figure 6 is a cross sectional view taken substantially along the plane of line 6—6 in Figure 5.

In the embodiment shown in Figures 4, 5 and 6, the distributing unit 170 includes a substantially cylindrical housing 172 having a bore 173 that extends vertically downwardly from the top thereof. This bore 173 does not extend completely through the housing 172 but instead, includes a lower portion 174 of reduced diameter that terminates short of the bottom of the housing 172 and forms an inlet chamber 178. This bore 173 also includes an enlarged upper portion 180 adapted to receive a cap member 182 and form a distributing chamber 184 and a portion 186 of intermediate diameter that receives a valve 188. These portions 174, 180 and 186 are separated by shoulders 190 and 192.

An inlet passage 194 adapted to be interconnected with a fuel pump extends horizontally inwardly from one side of the housing 172 and intersects the inlet chamber 178. A filter element 196 may be disposed in the inlet 194. Thus the fuel will pass through the filter 196 and under pressure into the inlet chamber 178.

The valve 188 includes a housing 198 which is threaded into the intermediate portion 186 so as to separate the inlet chamber 178 from the distributing chamber 184. A passage 200 extends through the housing 198 to interconnect the two chambers 178 and 184. This passage 200 includes a valve member 202 that permits fuel to flow from the inlet chamber 178 to the distributing chamber 184 but prevents the reverse flow. This valve member 202 is of the poppet type in which an enlarged head 204 is disposed in an enlargement 206 in the passage 200 and a stem 208 projects downwardly into the inlet chamber 178. The stem 208 may have flutes 210 thereon that slide inside of a guide member 212 projecting downwardly from the housing 198. This will maintain the valve member 202 in axial alignment and properly centered at all times. A spring 214 around the guide 212 biases the valve 202 closed. The tension of the spring 214 is selected to maintain a pressure upstream of the valve 202 that prevents the formation of any fuel vapors. After the fuel passes the head 204 of the valve member 202, it will circulate through the enlargement 206 in the passage 200 and then converge into the small diameter portion 216 of the passage 200. This will cause a more linear flow of the fuel and eliminate turbulence which might result from the circulation around the valve 202.

After the fuel flows through this passage 200, it will enter the distributing chamber 184 which is formed between the lower end of the cap member 182 and the top of the valve housing 198 and shoulder 190. This chamber 184 is preferably in a plane substantially normal to the axis of the passage 200 and very thin. In fact, the thickness of the chamber 184 should approach a thickness that will produce a capillary flow therethrough. As a result the fuel flow in the chamber 184 will be at a comparatively high velocity and free of turbulence. In order to distribute the fuel from the chamber 184 to the charges in the cylinders, the injector lines 217 may extend downwardly through the cap member 182 so as to communicate with the periphery of the chamber 184 at substantially equally spaced points and at substantially right angles to the plane of the chamber 184.

Under some operating conditions such as periods of acceleration, it may be desirable to produce a slightly richer mixture than is normally supplied. Accordingly, an accumulator chamber 218 may communicate with the enlarged portion 206 of the passage 200 downstream of the check valve 188 to collect fuel therefrom. The chamber 218 may include a diaphragm 220 responsive to a signal such as intake vacuum so as to collect fuel during periods when the fuel demands of the engine are low.

Thus when the vacuum is high the diaphragm 220 will be in a retracted position and will retain an accumulated volume of fuel therein. During some transient condition such as a period of acceleration the intake vacuum will become very low and the diaphragm 220 will discharge the fuel back into the enlargement 206. From here the fuel may flow into the distributing chamber 184 and be distributed to the various cylinders of the engine.

In addition, another enrichment means may be provided. This means includes a secondary fuel inlet 222 that is adapted to be interconnected with a source of fuel under pressure. A passage 224 may extend diagonally from the inlet 222 to an enrichment valve 226 that is normally closed so that no fuel may flow therethrough. The valve 226, in turn, is connected to the enlarged portion 206 of the passage 200 downstream from the check valve 188. During a condition such as starting a cold engine when a very rich mixture is required, the valve 226 may be opened to allow fuel to by-pass the check valve 188 and flow directly into the enlarged portion 206 of the passage 200 and thence into the distributing chamber 184. Since the fuel will not be required to open the valve 188, a low pressure fuel source may be employed for enriching the charge.

Figures 7, 8:
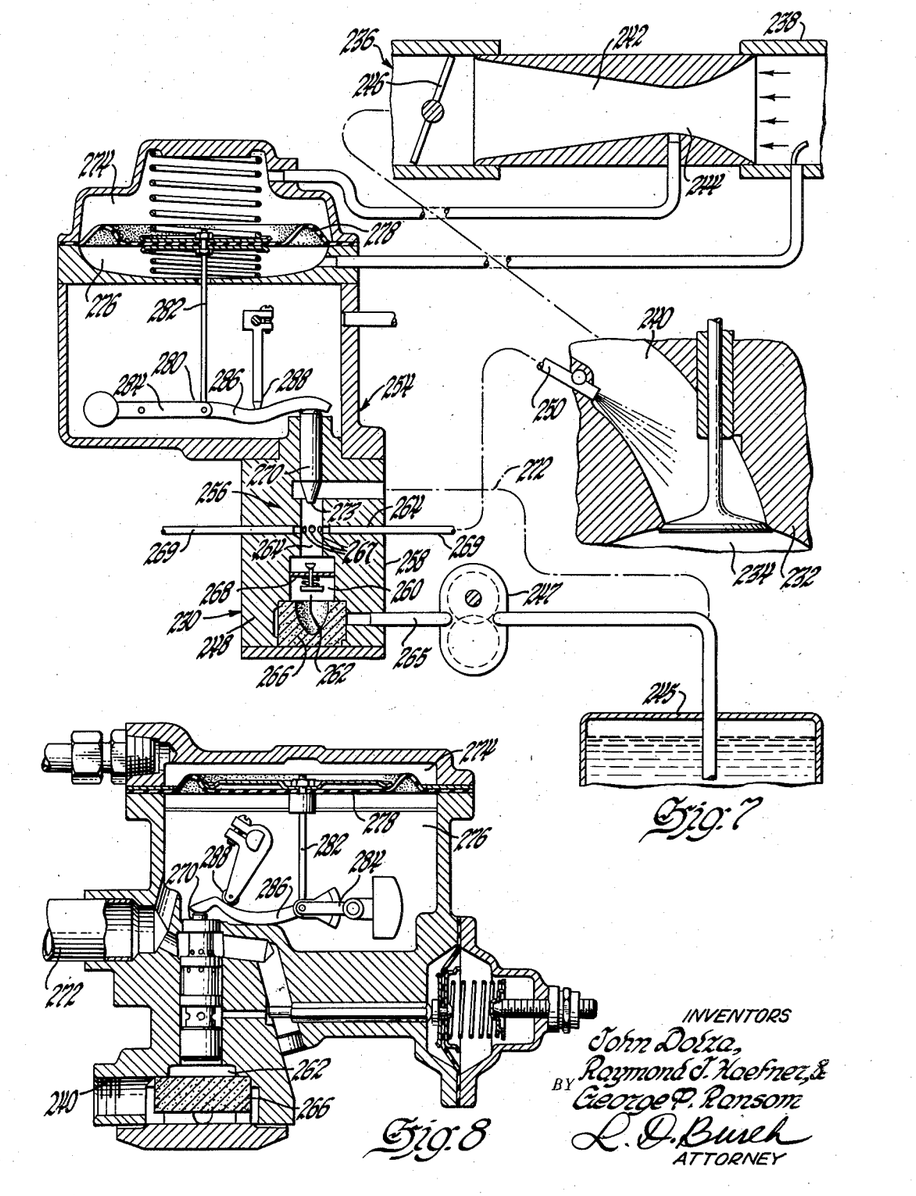
Figure 7 is a diagrammatic view of another fuel injection system embodying another form of the present invention.
Figure 8 is a cross sectional view of a metering and distributing unit suitable for use in the fuel injection system of Figure 7.

Another embodiment of the present invention is shown diagrammatically in Figure 7 as actually constructed in Figure 8. In this embodiment the fuel injection system 230 is adapted to be mounted on an engine having cylinder heads 232 with combustion chambers 234 formed therein. In order to charge the cylinders an induction system 236 may be provided which includes an inlet 238 and a plurality of intake passages 240 that communicate with the combustion chambers 234. The inlet 238 has a venturi 242 with a restricted throat 244 and a throttle valve 246 disposed posterior to the venturi 242.

The fuel system 230 includes a storage tank 245, pumping means 247, a fuel regulator 248 and a plurality of nozzles 250 which are disposed in the intake passages 240 for injecting metered quantities of fuel into the air flowing through the intake passages 240.

The fuel regulator 248 includes a housing having metering means 254 in the top thereof and a fuel distributor 256 in the bottom thereof.

The distributor 256 includes a housing 258 having a vertical passage 260 extending therethrough, the bottom of which forms an inlet chamber 262 and the top of which forms a distributing chamber 264. The inlet chamber 262 is adapted to be interconnected with the pumping means 247 by a fuel line 265 and, if desired, may include a filter element 266 for filtering all of the fuel passing through the system. A pressure check valve 268 may be disposed in the passage 260 for separating the inlet chamber 262 from the distributing chamber 264 and maintaining the fuel pressure in the inlet chamber 262 and pumping means 247 considerably higher than the pressure in the distributing chamber 264. A plurality of radial passages 267 may be drilled through the housing 258 to intersect the distributing chamber 264 at substantially equally spaced intervals and angles. Injector lines 269 may extend into these passages 267 for carrying the fuel to the various injector nozzles 250 disposed in the intake passages 240. These nozzles may be substantially the same as disclosed and claimed in copending application Serial No. 512,175 filed May 31, 1955. It will thus be seen that the fuel will divide equally amongst the various injector lines 269. A by-pass valve 270 may be disposed in the upper end of the distributing chamber 264 for controlling the escape of fuel from the distributing chamber 264. This fuel will by-pass the injector lines 269, etc. and will be returned to the storage tank 245 by a spill fuel line 272. It may thus be seen that the amount of distributed fuel may be metered by the action of the valve 270. The by-pass valve 270 is of the piston type wherein the bottom of the piston 273 has some predetermined area exposed to the pressure of the fuel in the distributing chamber 264 and will thus be subject to a force tending to open the valve 270 and by-pass more fuel. Since the metered fuel will pass through injector lines 269 and nozzles 250 which have a resistance the equivalent of a fixed orifice, this force will be indicative of the quantity of metered fuel distributed to the various cylinders.

The metering means for actuating the by-pass valve 270 includes a diaphragm chamber which is divided into upper and lower compartments 274 and 276 by means of a pressure responsive diaphragm 278. The upper compartment 274 is interconnected with the throat 244 of the venturi 242 while the lower compartment 276 is interconnected with the inlet 238 upstream of the venturi 242. Thus there will be a pressure differential across and consequently a force on the diaphragm 278 indicative of the volume of air entering the engine. The diaphragm 278 is operatively interconnected with the by-pass valve 270 in the distributing unit 256 by means of a linkage 280 having a vertical link 282, a pair of swinging levers 284 and 286 and an adjustable fulcrum point 288 for one of the levers 286. The end of this lever 286 rests on top of the piston 270 to bias the piston 270 toward the closed position with a force indicative of the amount of air flowing through the engine. It will thus be seen that there will be a pair of opposed forces on the piston valve 270 that will cause the valve to adjust itself until the air and fuel are flowing in some predetermined proportions. These proportions will be determined by such factors as the area of the diaphragm 278, the area of the piston 273, the mechanical advantage of the linkage 280, the strength of the intake vacuum signal and fuel pressure, etc. If it is desired to change the air-fuel ratio to meet the operating requirements of the engine means may be provided for changing the proportions of the charge by adjusting the position of the fulcrum 288 so as to change the mechanical advantage of a linkage 280 for increasing the strength of the air pressure signal, for diverting extra fuel into or out of the distributing chamber 264, etc.

It will thereby be seen that a simple, reliable and economical fuel distributing system has been provided which will insure a substantially uniform distribution of the fuel to all of the cylinders of the engine.

It is to be understood that, although the invention has been described with specific reference to particular embodiments thereof, it is not to be so limited since changes and alterations therein may be made which are within the full intended scope of this invention as defined by the appended claims.

1. A fuel distribution system for an internal combustion engine having a plurality of cylinders, said system comprising a distributing chamber having an inlet at one end thereof adapted to be connected to a source of fuel under pressure, a one-way check valve disposed in said inlet to permit a flow of fuel from said source into said chamber but to prevent a reverse flow from said chamber toward said source, said check valve being pressure responsive for maintaining the pressure of the fuel upstream of said check valve greater than the pressure of the fuel in said distributing chamber, a plurality of substantially identical fuel passages radiating from said distributing chamber at substantially equally spaced points and angles, the outer ends of said passages including injector nozzles for injecting fuel into the induction passages for said cylinders.

2. A fuel distribution system for an internal combustion engine having a plurality of cylinders, said distribution system comprising a housing having a distributing chamber therein, an inlet in said housing communicating with said chamber and adapted to be interconnected with a source of fuel under pressure, a one-way check valve to permit fuel to flow from said source into said chamber but to prevent fuel flow in a reverse direction, said valve being pressure responsive for maintaining the pressure of the fuel upstream of said check valve greater than pressure of the fuel in said distributing chamber, a plurality of substantially identical fuel passages radiating from said distributing chamber at substantially equally spaced points and angles, separate injector lines from each of said passages having nozzles on the outer ends thereof disposed in the induction passages for said cylinders for injecting fuel thereinto.

3. A fuel distribution system for an internal combustion engine having a plurality of cylinders, said distribution system comprising a housing having a distributing chamber therein, an inlet in said housing communicating with said chamber and adapted to be interconnected with a source of fuel under pressure, a one-way check valve adapted to permit fuel to flow from said source into said chamber but to prevent fuel flow in a reverse direction, said valve being pressure responsive for maintaining the pressure of the fuel upstream of said check valve greater than the pressure of the fuel in said distributing chamber, a plurality of substantially identical injector lines radiating from said distributing chamber at substantially equally spaced intervals and angles, an injector nozzle on the outer ends of said injector lines, each of said nozzles including an atmospheric vent adapted to form an envelope of air at substantially atmospheric pressure around said nozzle.

4. In a fuel injection system for an internal combustion engine having a plurality of cylinders, a fuel distribution system for distributing equal increments of fuel to the various cylinders of said engine, said fuel distribution system comprising a distributor having an inlet adapted to be connected to a source of fuel under pressure and a plurality of injector lines that radiate therefrom for distributing equal increments of fuel to said cylinders, a one-way check valve disposed in said inlet to permit fuel to flow from said source into said distributor but to prevent a flow in the reverse direction, said check valve being pressure responsive to maintain the pressure of the fuel in said injection system upstream thereof higher than the fuel pressure in said distributor.

5. In a fuel injection system for an internal combustion engine having a plurality of cylinders, a fuel distribution system for distributing equal increments of fuel to the various cylinders of said engine, said fuel distribution system comprising a distributor having an inlet connected to a source of fuel under pressure, said inlet including a pressure responsive check valve adapted to maintain the pressure of the fuel upstream thereof greater than the fuel pressure downstream thereof and to prevent a reverse flow from said distributor for return to the portion of said system upstream thereof, a plurality of injector lines radiating from said distributor for injecting fuel into the charges for said cylinders, a by-pass valve communicating with said distributor for metering the amount of fuel distributed by by-passing the surplus fuel from said distributor for return to said source.

6. A fuel distributing system comprising a distributing chamber having an inlet in one end thereof adapted to be connected with a source of fuel under pressure and a by-pass valve in the opposite end thereof effective to by-pass surplus fuel from said distributor for return to said source, a check valve in said inlet adapted to maintain the pressure of the fuel upstream from said chamber substantially higher than the pressure in said chamber and to prevent a reverse flow therepast, a plurality of injector lines radiating from said distributing chamber for distributing equal increments of metered fuel to the various cylinders of said engine, said by-pass valve being effective to meter the flow of fuel through said injector lines by by-passing the surplus fuel for return to said source.

7. A distributor for distributing equal increments of metered fuel to the charges for the cylinders of an internal combustion engine, said distributor comprising a housing having a passage extending axially therethrough to form a substantially cylindrical distributing chamber for fuel to flow axially therethrough, an inlet in said housing adapted to be connected to a source of fuel under pressure and communicating with said chamber to cause said fuel to flow axially therethrough, a plurality of radial passages through said housing intersecting said chamber at substantially equally spaced points and at substantially equal angles to allow equal increments of metered fuel to flow therethrough, said radial passages being adapted to feed said increments of fuel to injector lines having substantially identical nozzles on the ends thereof for injecting said increments into said charges.

8. A distributor for distributing equal increments of metered fuel to the charges for the cylinders of an internal combustion engine, said distributor comprising a housing having a passage extending axially therethrough to form a substantially cylindrical distributing chamber for fuel to flow axially therethrough, an inlet in said housing adapted to be connected to a source of fuel under pressure and communicating with said chamber to cause said fuel to flow axially therethrough, a by-pass valve in the opposite end of said chamber effective to meter the fuel in said chamber by by-passing the surplus fuel for return to said source, a plurality of radial passages through said housing intersecting said chamber at substantially equally spaced points and at substantially equal angles to allow equal increments of metered fuel to flow therethrough, said passages being adapted to feed said increments of fuel to injector lines having substantially identical nozzles on the ends thereof for injecting said increments into said charges.

9. A distributor for distributing equal increments of metered fuel to the charges for the cylinders of an internal combustion engine, said distributor comprising a housing having a passage extending axially therethrough to form a substantially cylindrical distributing chamber for fuel to flow axially therethrough, an inlet in said housing adapted to be connected to a source of fuel under pressure and communicating with said chamber to cause said fuel to flow axially therethrough, a by-pass valve in the opposite end of said chamber adapted to be operatively interconnected with means responsive to the fuel demands of said engine and effective to meter the fuel in said chamber by by-passing the surplus fuel for return to said source, a plurality of radial passages through said housing intersecting said chamber at substantially equally spaced points and at substantially equal angles to allow equal increments of metered fuel to flow therethrough, said passages being adapted to feed said increments of fuel to injector lines having substantially identical nozzles on the ends thereof for injecting said increments into said charges.

10. A distributor for a fuel injection system adapted to distribute equal increments of metered fuel to the charges for the cylinders of an internal combustion engine, said distributor comprising a housing having a passage extending axially therethrough to form a substantially cylindrical distributing chamber for fuel to flow axially therethrough, an inlet in said housing communicating with one end of said chamber and adapted to be connected to a source of fuel under pressure, a check valve disposed in said inlet to allow fuel to flow from said source to said chamber but to prevent said fuel flowing in a reverse direction, said check valve being pressure responsive to maintain the pressure of the fuel upstream thereof greater than the pressure of the fuel downstream thereof, a plurality of radial passages through said housing intersecting said housing at substantially equally spaced points and angles to allow equal increments of metered fuel to flow therethrough, said passages being adapted to feed said increments of fuel to injector lines having substantially identical nozzles on the ends thereof for injecting said increments in said charges.

11. In a fuel injection system for an internal combustion engine having a plurality of cylinders and an induction system with induction passages for charging said cylinders, a fuel distribution system for distributing equal increments of fuel to the various cylinders of said engine, said fuel distribution system comprising a distributing chamber having a very thin thickness, an inlet disposed at substantially right angles to said chamber and including a pressure responsive check valve adapted to maintain the fuel pressure anterior thereto greater than the pressure posterior thereto, a plurality of injector lines disposed substantially normal to the plane of said chamber and intersecting said chamber at substantially equally spaced points, and injector nozzles on the outer ends of said injector lines disposed in said induction passages for injecting metered quantities of fuel into the charge therein.

12. In a fuel injection system for an internal combustion engine having a plurality of cylinders, a fuel distribution system comprising a distributor having an inlet adapted to be connected to a source of fuel under pressure, a plurality of injector lines radiating from said distributor for distributing equal increments of fuel to said cylinders, a one-way pressure responsive check valve disposed in said inlet to permit fuel to flow from said source into said distributor but to prevent a flow in the reverse direction, said check valve being pressure responsive to maintain the pressure of the fuel in said injection system upstream therefrom higher than the fuel pressure downstream thereof, the volume of said distributing system downstream from said check valve being considerably smaller than the volume upstream thereof.

13. In a fuel injection system for an internal combustion engine having a plurality of cylinders, a fuel distribution system for distributing equal increments of fuel to the various cylinders of said engine, said fuel distributing system comprising a distributing chamber having an inlet adapted to be connected to a source of fuel under pressure, said inlet including a pressure responsive check valve adapted to maintain the pressure of the fuel upstream thereof greater than the fuel pressure downstream thereof and to prevent a reverse flow from said distributing chamber for return to the portion of said system upstream thereof, a plurality of injector lines radiating from said distributing chamber and having injector nozzles on the outlet ends thereof which are adapted to inject said equal increments of fuel into said charges, a by-pass valve communicating with said distributing chamber for metering the amount of said distributing fuel by by-passing the surplus fuel from said distributing chamber for return to said source, said by-pass valve being responsive to the pressure of the fuel in said distributing chamber.

14. A distributor for distributing equal increments of fuel to the charges for the cylinders of an internal combustion engine, said distributor comprising a planular distributing chamber having a relatively thin thickness, an inlet adapted to receive fuel under pressure from a source, said inlet communicating with the center of said chamber at substantially right angles thereto, a plurality of outlet passages disposed substantially parallel to said inlet and intersecting said distributing chamber adjacent the periphery thereof and at substantially equally spaced intervals and at substantially equal angles.

15. A distributor for a fuel injection system adapted to distribute equal increments of metered fuel to the charges for the cylinders of an internal combustion engine, said distributor comprising a housing having a relatively thin distributing chamber disposed in a plane substantially normal to the axis of said housing, an inlet communicating with the center of said chamber at substantially right angles thereto and adapted to be connected to a source of fuel to supply fuel thereto under pressure, a pressure responsive check valve in said inlet to maintain the pressure anterior thereto greater than the pressure posterior thereto and to prevent a reverse flow from said chamber therepast, a plurality of outlet passages intersecting said chamber adjacent the periphery thereof at substantially equally spaced intervals and angles, said passages being adapted to be connected to injector nozzles disposed in the induction passages for said cylinders.

References Cited in the file of this patent

UNITED STATES PATENTS

| | | |
|---|---|---|
| 1,662,040 | Lee | Mar. 6, 1928 |
| 2,136,959 | Winfield | Nov. 15, 1938 |
| 2,448,131 | Williams, Jr. et al. | Aug. 31, 1948 |
| 2,511,213 | Leslie | June 13, 1950 |
| 2,725,861 | Leibing | Dec. 6, 1955 |